US00RE35463E

United States Patent [19]

Vetter et al.

[11] E Patent Number: Re. 35,463

[45] Reissued Date of Patent: Feb. 25, 1997

[54] SASH LOCK

[75] Inventors: Gregory J. Vetter, Owatonna; Daniel G. Tucker, deceased, late of Waseca, both of Minn., by Sabrina Tucker, legal representative

[73] Assignee: Truth Hardware Corporation, Owatonna, Minn.

[21] Appl. No.: 191,876

[22] Filed: Feb. 4, 1994

Related U.S. Patent Documents

Reissue of:

[64] Patent No.: 5,087,087
Issued: Feb. 11, 1992
Appl. No.: 669,530
Filed: Mar. 14, 1991

[51] Int. Cl.[6] ..... E05L 3/08

[52] U.S. Cl. ..... 292/48; 292/241; 292/DIG. 47

[58] Field of Search ..... 292/DIG. 47, DIG. 64, 292/240, 241, 242, 48, 199; 49/279

[56] References Cited

U.S. PATENT DOCUMENTS

| | | | |
|---|---|---|---|
| 2,411,485 | 11/1946 | Webster | 292/241 |
| 2,751,639 | 6/1956 | Oswald | 292/241 |
| 4,059,298 | 11/1977 | Van Klompenburg | 292/199 |
| 4,095,829 | 6/1978 | Van Klompenburg | 292/241 |
| 4,253,688 | 3/1981 | Hosooka | 292/241 |
| 4,429,910 | 2/1984 | Anderson | 292/199 |
| 4,507,894 | 4/1985 | Anderson | 292/DIG. 47 |
| 4,610,472 | 9/1986 | Billingstein | 292/241 |
| 4,621,847 | 11/1986 | Paulson et al. | 292/241 |
| 4,674,777 | 6/1987 | Guelck | 292/241 |
| 4,736,972 | 4/1988 | Mosch | 292/241 |
| 4,807,914 | 2/1989 | Fleming et al. | 292/48 |

*Primary Examiner*—Eric K. Nicholson
*Attorney, Agent, or Firm*—Wood, Phillips, VanSaten, Clark & Mortimer

[57] ABSTRACT

An improved structure is provided for a window sash lock having a catch mounted to a face of a window frame to grasp and release a keeper reciprocally mounted to a face of a window sash. A housing (12) is mounted against the frame face (13) that has an opening therethrough with a portion substantially cylindrical about an axis perpendicular to the frame face (13). An operator (52) for the catch (32) comprises a cylindrical pivotal portion (56) which is receivable within the housing cylindrical portion and is adapted to pivot about the axis. The operator also includes a handle portion (54) secured at one end to the operator pivotal portion (56). The operator further comprises an actuator portion having a button (60) at one end for engaging the catch to control movement thereof. The actuator portion is secured at the other end to the operator pivotal portion. A part of the actuator portion is trapped between the housing and the frame face to prevent removal of the operator from the mounted housing.

17 Claims, 3 Drawing Sheets

SASH LOCK

Matter enclosed in heavy brackets [ ] appears in the original patent but forms no part of this reissue specification; matter printed in italics indicates the additions made by reissue.

BACKGROUND OF THE INVENTION

1. Technical Field

The present invention is directed toward window sash locks and more particularly toward easily assembled low profile window sash locks.

2. Background Art

Window locks are known in the art that generally involve having a catch with a handle operator affixed to a window frame which interacts with a keeper on a corresponding section of a movable window sash to securely hold the sash tightly against the frame. Also known in the art are devices for sequential multipoint lock-up of the movable window sash with the window frame. These latter devices are locked which have a handle actuator interacting with a keeper at one point on a window frame and sash respectively which causes a second lock to engage a keeper at a distant location.

Commonly owned U.S. patent application Ser. No. 297, 490 in the name of Nolte et al filed Jan. 17, 1989 now abandoned, hereby incorporated by reference, discloses such a multipoint lock for a window sash. This device uses a slider connecting two spaced apart catches which can interact with keepers affixed to a window sash to establish a locked condition of the window. The movement of a handle actuator from its unlocked position causes an adjacent cam member on a catch to connect with a planar portion of an associated ramped keeper. The movement of the catch causes the slider, which has a length of movement along a path between the two keepers, to move the second cam member onto the planar section of the associated ramped keeper.

However, with many such window locks, there is a danger of the handle portion being brushed against or otherwise moved, resulting in the accidental unlocking of the window. Likewise, there is a danger of the handle being broken off or otherwise disabled.

Further, there is a problem in manufacturing a handle, which is rotated in an arc between a locked and unlocked position, in a limit position. For example, when such a lock is affixed vertically on a window frame, gravitational forces act on the lock handle while in the raised position to push it downward. Therefore, it is desirable to maintain the handle in its locked or unlocked position in opposition to forces moving it between limit positions.

The present invention is directed toward overcoming one or more of the problems discussed above.

SUMMARY OF THE INVENTION

In one aspect of the present invention, an improved structure is provided for a window sash lock having a catch mounted to a face of a window to grasp and release a keeper reciprocally mounted to a face of a window sash. A housing is mounted against the frame face that has an opening therethrough with a portion substantially cylindrical about an axis perpendicular to the frame face. The catch operator includes a cylindrical pivotal portion which is receivable within the housing cylindrical portion and is adapted to pivot about the axis, and a handle portion secured at one end to the operator pivotal portion which remains external to the housing. The operator further includes an actuator portion having a button at one end for engaging the catch to control movement thereof. The actuator portion is secured at the other end to the operator pivotal portion. A part of the actuator portion is trapped between the housing and the frame face to prevent removal of the operator from the mounted housing.

Another aspect of the present invention provides a method of assembling a lock that can releasably maintain a window frame adjacent a window sash, wherein the lock includes a catch, an operator, and a housing. First, the operator actuator portion is extended through the housing opening. Next, the operator and housing are pivoted relative to one another about an axis substantially perpendicular to the housing cylindrical portion axis to dispose the operator pivotal portion within the housing cylindrical portion. Finally, the housing is mounted against the window frame face.

In another aspect of the present invention, the catch includes flexible forked sections between which a generally circular button on an actuator portion of a catch operator is capable of moving. The tips of the catch sections protrude inwardly a distance apart slightly less than the diameter of the button and are capable of being moved apart a distance greater than the diameter of the button.

It is an object of the invention to provide a handle which is secure in both locked and unlocked positions, by preventing the lock from inadvertently and undesirably moving out of a limit position. In a lock positioned against an interior vertical face of a window frame having a handle which moves in an arc about an axis perpendicular to the frame, the handle does not protrude outwardly into the room where the window is located. In that way, the danger of the handle being brushed against and moving out of a limit position is minimized. Moreover, the tips of the catch forked sections, that engage the catch operator actuator portion, protrude inwardly preventing the operator actuator portion from moving between the forked sections absent significant pressure on the handle. Therefore, a light pressure on the handle from it being brushed against or from gravitational forces acting on the handle in a raised position does not cause the lock to shift from its locked or unlocked position.

It is a further object to provide an aesthetically pleasing lock by minimizing the degree to which a lock handle protrudes into a room.

It is a still further object to provide a lock that can be easily assembled. It is desirable to have a lock handle securely abutting from the housing, without using fasteners, such as screws, to hold the handle in place. In particular, in a lock having a catch with forked sections which coacts with a button end of an operator, it is desirable to have a method for easily inserting the button end through the lock housing and securely holding it in place while allowing for efficient interaction with the catch.

DESCRIPTION OF THE PREFERRED EMBODIMENT

Figure 1:
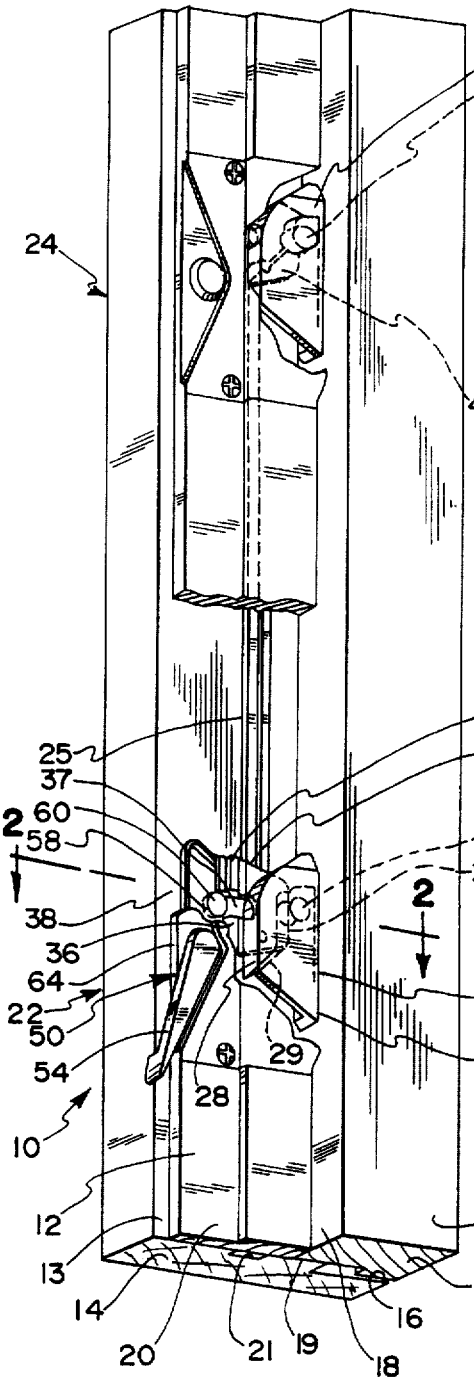
FIG. 1 is a perspective view of a window frame and sash having a lock structure associated therewith in a fully locked position, with portions broken away to show internal components.

Referring to FIG. 1, a multipoint window lock generally indicated by 10 is positioned within a housing 12 mounted onto an interior face 13 of a window frame 14. A window sash generally indicated at 15 has a vertical first face 16, a parallel second face 17, and a vertical perpendicular third face 18.

The housing 12 has a first face 19, a second face 20, and a third face 21. The housing third face 21 is affixed to the frame interior face 13. When the window is in a closed position, the sash first face 16 is adjacent the frame interior face 13 and the sash third face 18 is adjacent the housing first face 19.

The window sash 15 is part of a casement window (not shown) which is pivotally mounted. The window could be pivotable around either a horizontal or a vertical axis. The mounting of such a window by hinges is well-known in the art. There are many window arrangements, known in the art, which can be used with the lock 10. In general, the window lock 10 securely holds the sash 15 tightly against the frame 14 to prevent light and air infiltration.

The multipoint lock 10, which will hereafter be described, is only one example of a type of lock which would benefit from incorporating the present invention.

Referring to FIG. 1, the locking mechanism 10 is comprised of a master lock, shown generally at 22, and a slave lock, shown at 24. A tie bar 25 links the two locks 22 and 24 for facilitating sequential lock up in tandem.

A master lock keeper 26, has an inward side 27 and an outward side 28. The inward side 27 is mounted perpendicularly onto the sash side face 18 at one end thereof corresponding to the location of the master lock 22 on the frame 14. The keeper 26 has an interior ramped portion 29 and a planar portion 30.

The master lock 22 includes a catch 32 secured between the housing 12 and the interior frame face 13, adjacent the location of the master lock keeper 26 on the sash third face 18. Guides (not shown) are provided within the housing 12 to facilitate the movement of the catch 32 within the housing 12.

The catch 32 has a cam member 34 at one end, which can interact with the ramped portion of the keeper 29 and move onto the planar portion 30, securely pulling the sash first face 16 to the frame interior face 13. The catch 32 has flexible forked sections 35 and 36 with an open ended slot 37 therebetween at the opposite end from the cam 34. An arcuate guidance rim 38 extends around from the outer ends of the forked sections 35 and 36.

The tie bar 25 is connected at one end to the master lock catch 32 and is connected at the opposite end to a slave lock catch 40 also secured between the housing 12 and the frame 13. The catch 40 interacts through a cam 42 with a reciprocal slave lock keeper 44 affixed to the sash third face 18. The tie bar 25 is movable in a path extending lengthwise through the housing 12 between the master and slave locks, 22 and 24.

Figure 2:
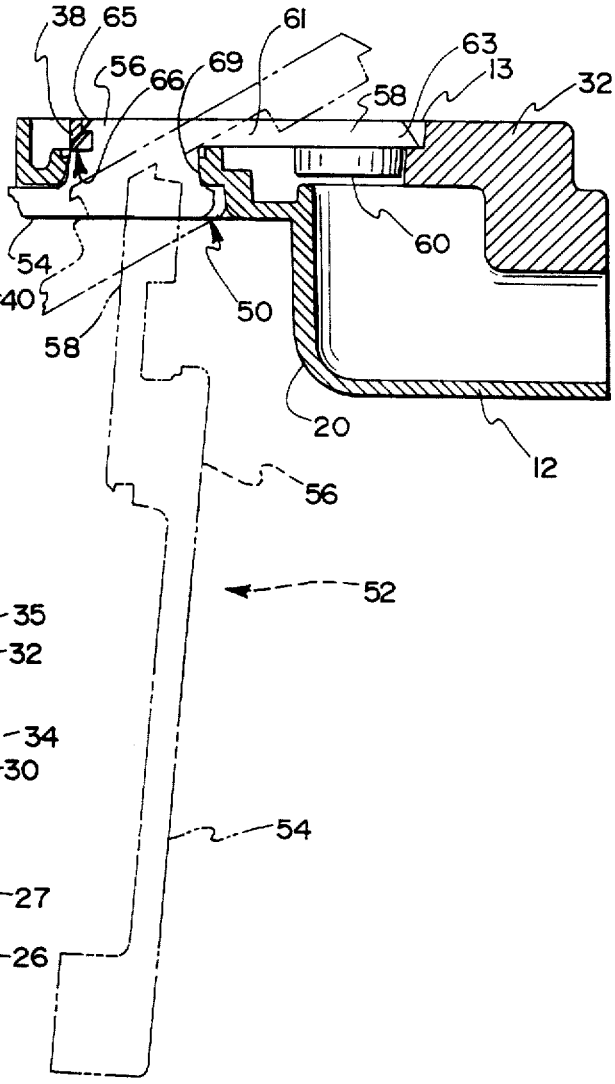
FIG. 2 is a cross-sectional view, taken along the 2—2 line of FIG. 1, showing the assembly of the catch operator with the lock housing, the handle being shown in phantom in two successive positions during assembly.

Referring to FIG. 2, the preferred embodiment of the invention is shown wherein the housing 12 has an opening 50, through the second face 20 thereof, with a portion substantially cylindrical about an axis [51] substantially perpendicular to the frame interior face 13. A catch operator 52 is partially disposed between the interior frame face 13 and the housing 12 through the opening 50.

The operator 52 has a handle portion 54 which is the only part visible from the exterior of the lock 10. (See FIG. 1) The handle portion 54 is secured at one end to an operator pivotal portion 56. The pivotal portion 56 is generally cylindrical and is receivable within the housing cylindrical opening 50 and is adapted to pivot around the axis [51].

An operator actuator portion 58 is secured to the pivotal portion 56 at the opposite end from the handle 54. The actuator potion 58 has a generally circular button 60 at one end for engaging the catch forked sections 35 and 36 to control the movement of the cam 34 onto and off of the ramped portion of the master keeper 29 (See FIG. 1).

A part of the actuator portion 61 is trapped between the housing 12 and the frame interior face 13 to prevent movement of the operator 52 away from the mounted housing 12. The actuator portion 58 has a shoulder 63 that is engageable by the catch forked sections 35, 36.

The pivotal portion 56 has a shoulder 65 which mates with a shoulder 66 on the catch 32 to securely maintain the pivotal portion 56 in engagement with the catch 32 during shipping and handling. The catch shoulder 66 is flexible and ramped away from the pivotal portion shoulder 65 while the pivotal portion shoulder 65 is ramped away from the catch shoulder 66 to make installation of the operator 52 with the catch 32 easier.

The operator 52 can move between two limit positions. One of these limit positions is the window locked position where the handle portion 54 is lowered and generally parallel to the sash side face 18, as shown in FIG. 1. The handle 54 can travel in about a 135° arc to bring the window into the other limit position, the unlocked position. The movement is generally in a plane perpendicular to the sash third face 18 and parallel to the interior frame face 13. The handle 54 moves in a triangular indentation 64 in the housing 12 and does not protrude above the housing second face 20.

The movement of the lock handle 54 from the fully unlocked to the fully locked positions for the sequential locking of this exemplary lock 10 incorporating the present invention in the best mode contemplated by the inventor is illustrated in FIGS. 3–6.

Figure 3:
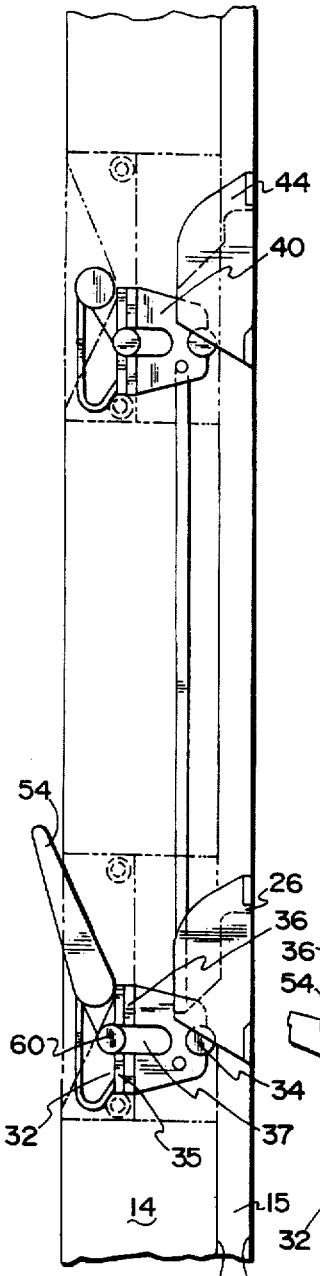
FIG. 3 is a plan view of a lock in the fully unlocked position.

Referring to FIG. 3, the lock 10 is fully unlocked, and the handle 54 is in a raised position. The button 60 of the actuator portion 58 is adjacent the slot 37 between the catch forked sections 35,36. The sash third face 18 is adjacent but apart from the housing first face 19.

Figure 4:
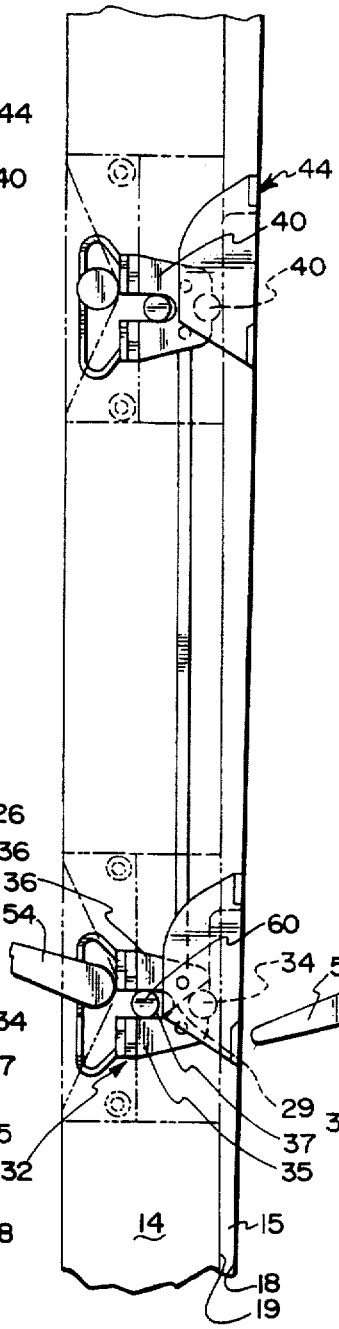
FIG. 4 is a plan view of the initial locking of the master lock of FIG. 3.
Figure 5:
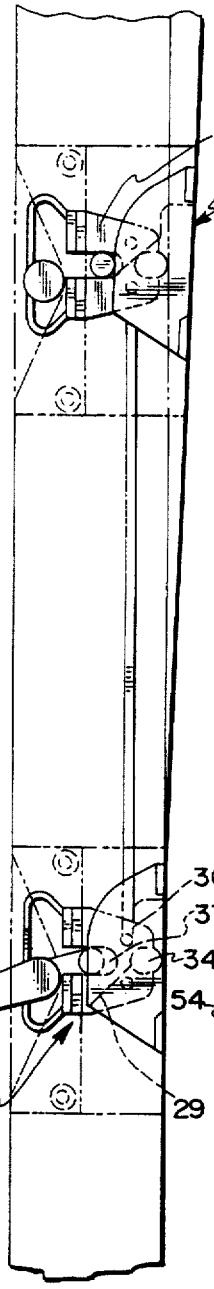
FIG. 5 is a plan view of the initial locking of the slave lock of FIG. 3.

During the counterclockwise rotation of the handle 54 out of the unlocked position, as in FIGS. 4 and 5, the operator actuator portion 58 pushes the catch 32 upwards while the button 60 moves sequentially inwardly and outwardly of the slot 37, in engagement with the catch forked sections 35,36. When the handle 54 is moved in the clockwise direction, the button 60 moves the catch 32 downwardly while moving sequentially inwardly and outwardly of the slot 37 coacting with the edge of the catch forked sections 35,36.

Referring to FIG. 4, as a downward counterclockwise force is exerted on the handle 54, the button 60 is moved between the catch forked sections 35,36 while moving the catch 32 upwards. Consequently, the cam 34 is moved upwards onto the keeper ramped portion 29 thus moving the sash 15 and the frame 14 closer together. The tie bar 25 is also moved upward by the upward movement of the catch 32. The upward movement of the tie bar 25 exerts an upward force on the slave catch 40, moving it toward the slave keeper 44.

Referring to FIG. 5, further counterclockwise pressure on the handle 54 moves the catch 32 further upward. As the master catch 32 is moved further upward, the cam 34 is moved onto the keeper planar portion 30, thereby tightly closing the sash 15 and frame 14 in the vicinity of the master lock 22. The tie bar 25 moves the slave cam 42 onto a ramped portion of the slave lock keeper 44.

Figure 6:
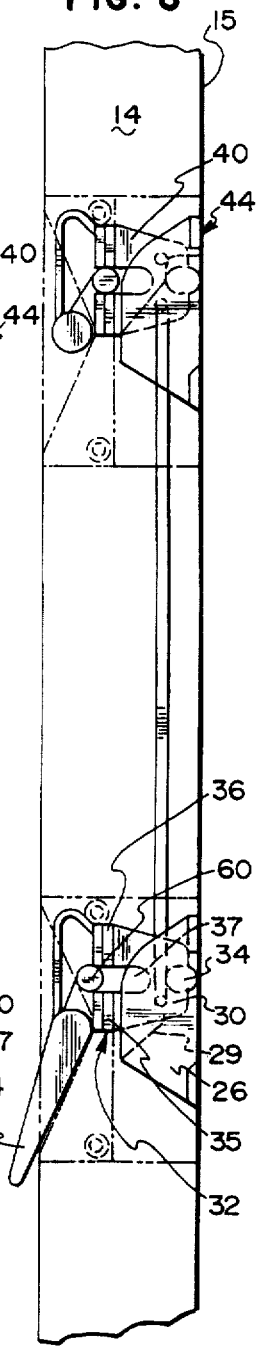
FIG. 6 is a plan view of the lock of FIG. 3 in the fully locked position.

Referring to FIG. 6, in the fully locked position, the handle 54 is extended downward and the slave cam 42 is on the planar portion of the slave keeper 44, while the sash 15 and frame 14 are tightly locked at all points.

The multipoint locking of the lock 10 is achieved through the delayed lockup of the slave cam 42 and ramped keeper 44 following the locking of the master cam 32 and ramped keeper 26. The details of the movements of the tie bar 25 and the interaction between the master lock 22 and the slave lock 24 are fully described in the commonly owned U.S. patent application Ser. No. 297,490.

As mentioned previously, the multipoint lock 10, described above, is only one example of a type of lock in which the present invention could be incorporated.

As is apparent from the foregoing, the configuration of the catch operator 52 and housing 12 protects the integrity of the lock. The housing 12 is affixed to the interior frame face 13 and the operator 52 moves through an arc generally parallel to the frame face 13 and thus never protrudes out perpendicular to the frame face 13. Consequently, the handle does not protrude into the room where the window is located. In that way, the possibility of the handle being brushed against is lessened.

Referring to the successive positions in phantom in FIG. 2, the lock catch operating structure is easily assembled with the housing 12 by first extending the operator actuator portion 58 through the cylindrical portion of the opening 50 in the housing 12. The operator 52 and housing 12 are then pivoted relative to one another about an axis substantially perpendicular to the housing cylindrical portion axis [51] to dispose the operator pivotal portion 56 within the housing cylindrical portion 50. The pivotal portion 56 has a notch 69 which aids in guiding the operator 52 into proper position relative the housing 12.

The operator actuator and pivotal portions, 58 and 56, are also inserted into the catch 32. The pivotal portion shoulder 65 pushes the flexible ramped catch shoulder 66 and is snapped into place, as shown in FIG. 2. Thereafter, the operator 52 and catch 32 are securely connected so as not to come apart during shipment. The ramped portions of the shoulders 65 and 66 make installation of the operator 52 with the catch 32 easier.

The actuator portion 58 is then secured between the frame first face 13 and the housing 12 by mounting the housing 12 against the interior window frame face 13. The handle can thus be easily assembled with the lock and securely maintained adjacent the frame without requiring additional parts, such as a screw or other fastener. In that way, production costs for extra parts and labor are reduced.

Figure 8:
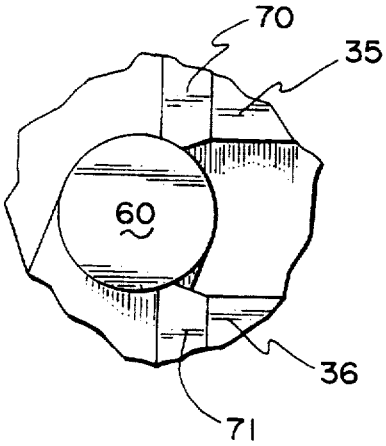
FIG. 8 is a close-up view of the button and detents of FIG. 6.
Figure 7:
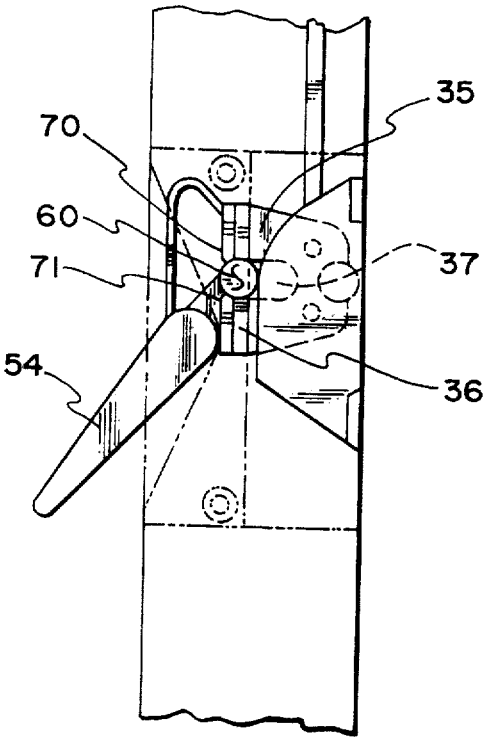
FIG. 7 is a plan fragmentary view of a master lock showing the interaction of the button portion of a catch operator with forked sections of a catch.
Figure 9:
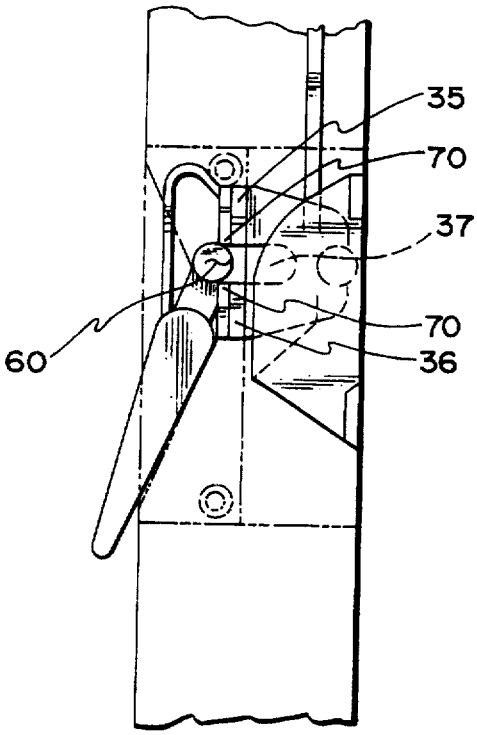
FIG. 9 is a plan fragmentary view of the lock of FIG. 7 in the fully locked position.

Referring to FIGS. 7–9, ends 70,71 of the flexible catch forked sections 35,36 protrude inwardly a distance from each other slightly greater than the diameter of the button 60 to act as detents. The button 60 is prohibited from moving between the forked sections 35,36 unless a sufficiently strong pressure is exerted on the operator handle 54 to separate the catch forked section ends 70,71. Thus, the operator 52 is maintained in a limit position despite the force of gravity or from being bumped. When the button 60 is within the slot 37, the button 60 is secured between the ends of the forked sections 70,71 requiring additional pressure to continue movement of the catch 32 to lock or unlock the window.

As can be seen from the foregoing, there are many advantages of the present structure for the catch operator 52 and housing 12. The handle 54 never protrudes perpendicularly outward from the frame into a room where the window is located. There is therefore a reduced danger of accidentally disturbing the lock by brushing against it. Moreover, the shape of the forked sections 35 and 36 further prevents accidental movement of the lock between limit positions.

The catch operator 52 is easily assembled with the housing 12 and the operator 52 securely maintained in place by snaking the actuator portion 58 through the cylindrical opening 50 in the housing 15 and snapping it down prior to installing the housing 12 against the frame face 13. Consequently, a portion of the operator is secured between the housing and the frame without requiring an additional fastener part, thereby, reducing production costs.

Still other aspects, objects and advantages of the present invention can be obtained from a study of the specification, the drawings and the appended claims.

What is claimed is:

1. In a lock including a keeper on a window sash and a catch reciprocally mounted to a face of a window frame for grasping and releasing the keeper, an improved structure for operating said catch comprising:

a housing for mounting against the frame face, said housing including an opening therethrough with a portion substantially cylindrical about an axis substantially perpendicular to the frame face; and an operator including a cylindrical pivotal portion secured by the housing cylindrical portion for pivoting within said cylindrical portion about said axis, a handle portion secured at one end to the operator pivotal portion, and an actuator portion having a button at one end for engaging the catch to control movement thereof, said actuator portion being secured at the other end to the operator pivotal portion, whereby a part of said actuator portion is trapped between said housing and said frame face to prevent removal of said operator from the mounted housing.

2. The lock catch operating structure of claim 1 further comprising a shoulder on said actuator portion capable of being engaged by the catch to assist in maintaining the operator within the housing.

3. The lock catch operating structure of claim 1 wherein said pivotal portion has a shoulder adjacent said actuator portion for maintaining said pivotal portion securely within the opening in said housing.

4. The lock of claim 1 further comprising detents on said catch to secure said operator between two limit positions.

5. In a lock including a keeper on a window sash and a catch having flexible forked sections, said catch being reciprocally mounted to a face of a window frame for grasping and releasing the keeper, an improved structure for operating said catch comprising:

a housing for mounting against the frame face, said housing including an opening therethrough with a portion substantially cylindrical about an axis substantially perpendicular to the frame face; and an operator including a cylindrical pivotal portion receivable within the housing cylindrical portion and adapted to pivot about said axis, a handle portion secured at one end to the operator pivotal portion, and an actuator portion having a button at one end for engaging the catch to control movement thereof, said button being generally circular and capable of moving between said catch forked sections and said actuator portion being secured at the other end to the operator pivotal portion, whereby a part of said actuator portion is trapped between said housing and said frame face to prevent removal of said operator from the mounted housing.

6. The lock of claim 5 wherein said forked sections have ends that protrude inward at a distance apart slightly less than the diameter of said button.

7. A method of assembling a lock catch operating structure for a lock including a keeper on a window sash and a catch reciprocally mounted to a face of a window frame for grasping and releasing the keeper, said lock catch operating structure including a housing for mounting against the frame face, said housing including an opening therethrough with a portion substantially cylindrical about an axis substantially perpendicular to the frame face; and an operator including a cylindrical pivotal portion receivable within the housing cylindrical portion and adapted to pivot about said axis, a handle portion secured at one end to the operator pivotal portion, and an actuator portion having a button at one end for engaging the catch to control movement thereof, said actuator portion being secured at the other end to the operator pivotal portion, whereby a part of said actuator portion is trapped between said housing and said frame face to prevent removal of said operator from the mounted housing, said method comprising the steps of:

extending said operator actuator portion through said housing opening;

pivoting said operator and housing relative to one another about an axis substantially perpendicular to said housing cylindrical portion axis to dispose said operator pivotal portion within said housing cylindrical portion; snapping said operator into engagement with said catch; and mounting said housing against the window frame face.

8. A lock for a window frame including a catch capable of grasping and releasing a keeper mounted on a window sash so as to releasably maintain the frame adjacent the sash, said lock comprising:

a housing for mounting against an interior face of the frame, said housing having a cavity and an opening therethrough with a portion substantially cylindrical about an axis substantially perpendicular to the frame face; and an operator having a portion receivable within said housing cylindrical portion and adapted to pivot about said axis, a handle portion secured at one end to the pivotal portion and extending outward from said housing when said pivotal portion is within said housing, and an actuator portion having a button at one end for engaging said catch to control movement thereof and being secured at the other end to the operator pivotal portion, said actuator portion capable of being inserted through said housing opening whereby said actuator portion is trapped between said housing and the frame when said housing is mounted against the frame to prevent removal of said operator from the mounted housing.

9. The lock of claim 8 further comprising guides in said housing for controlling the movement of the catch.

10. The lock of claim 8 further comprising a shoulder on said catch which is engageable with an operator pivotal portion shoulder.

11. The lock of claim 10 wherein said catch shoulder is flexible and ramped relative said operator pivotal portion shoulder and said operator pivotal portion shoulder is ramped relative said catch shoulder.

12. A method of assembling a lock for releasably maintaining a window frame adjacent a window sash, said lock including a catch, an operator, and a housing, said method comprising the steps of:

inserting an actuator portion of the operator through a housing opening which is generally cylindrical about an axis;

pivoting said operator and housing relative to one another about a second axis substantially perpendicular to said housing opening axis to dispose a cylindrical portion of the operator within the housing opening; and mounting said housing against an interior face of the window frame with the operator actuator portion substantially adjacent said interior face whereby said interior face blocks said operator against reverse pivoting of said operator about said second axis which would displace said cylindrical portion from the housing opening.

13. In a lock including a keeper on a window sash and a catch reciprocally mounted to a face of a window frame for grasping and releasing the keeper, an improved structure for operating said catch comprising:

a housing for mounting against the frame face, said housing defining an interior open to the frame face when mounted thereagainst and including an opening through said house with a portion substantially cylindrical about an axis substantially perpendicular to the frame face; and an operator including a cylindrical pivotal portion secured by the housing cylindrical portion for pivoting within said cylindrical portion about said axis, a handle portion secured at one end to the operator pivotal portion, and an actuator portion connected to the operator pivotal portion and supporting an engaging member for engaging the catch to control movement thereof, said actuator portion being disposed in the housing interior and adjacent said frame face when said housing is mounted thereagainst to prevent removal of the operator cylindrical pivotal portion from the housing cylindrical [pivotal portion from the housing cylindrical] portion.

14. A method of assembling the lock catch operating structure recited in claim 13, comprising the steps of:

extending said operator actuator portion through said housing opening;

pivoting said operator and housing relative to one another about an axis substantially perpendicular to said housing cylindrical portion axis to dispose said operator pivotal portion within said housing cylindrical portion; and mounting said housing against the window frame face.

*15. A lock for a window frame including a catch capable of grasping and releasing a keeper mounted on a window sash so as to releasably maintain the frame adjacent the sash, said lock comprising:*

*a housing for mounting against an interior face of the frame, said housing having a cavity and an opening therethrough with a portion substantially cylindrical about an axis substantially perpendicular to the frame face; and*

*an operator having*

*a portion receivable within said housing cylindrical portion and adapted to pivot about said axis,*

*a handle portion extending from the pivotal portion, and*

*an actuator portion extending from the pivotal portion and having a button at one end for engaging said catch to control movement thereof;*

*whereby said frame interior face secures the receivable operator portion in the housing cylindrical portion when said housing is mounted against the frame by preventing substantial movement of the operator other than pivoting about said axis.*

*16. A method of assembling a lock catch operating structure for a lock including a keeper on a window sash and a catch reciprocally mounted to a face of a window frame for grasping and releasing the keeper, said lock catch operating structure including*

*a housing for mounting against the frame face, said housing including an opening therethrough with a portion substantially cylindrical about a first axis substantially perpendicular to the frame face; and*

*an operator including*

*a cylindrical pivotal portion receivable within the housing cylindrical portion and adapted to pivot about said axis,*

*a handle portion extending radially from the operator pivotal portion, and*

*an actuator portion extending radially from the operator pivotal portion and having a button at its end for engaging the catch to control movement thereof, whereby a part of one of said radially extending portions is disposed between said housing and said frame face,*

*said method comprising the steps of:*

*extending said operator actuator portion through said housing opening;*

*pivoting said operator and housing relative to one another about a second axis substantially perpendicular to said first axis to dispose said operator pivotal portion within said housing cylindrical portion;*

*snapping said operator into engagement with said catch; and*

*mounting said housing against the window frame face to prevent removal of said operator from the housing by preventing pivoting of said operator and housing relative to the second axis.*

*17. In a lock including a keeper on a window sash and a catch reciprocally mounted to a face of a window frame for grasping and releasing the keeper, an improved structure for operating said catch comprising:*

*a housing for mounting against the frame face, said housing including an opening therethrough with a portion substantially cylindrical about an axis substantially perpendicular to the frame face; and*

*an operator including*

*a cylindrical pivotal portion secured by the housing cylindrical portion for pivoting within said cylindrical portion about said axis,*

*a handle portion secured at one end to the operator pivotal portion and extending therefrom, and*

*an actuator portion having a button at one end for engaging the catch to control movement thereof, said actuator portion being secured at the other end to the operator pivotal portion and extending therefrom, whereby a part of one of said extending portions is trapped between said housing and said frame face to prevent removal of said operator from the mounted housing.*

* * * * *